Jan. 24, 1967 N. J. PANZICA ET AL 3,299,621
ROTARY FLOW GAS WASHER
Filed June 15, 1964 3 Sheets-Sheet 3

INVENTORS
NICHOLAS J. PANZICA
ROBERT M. JAMISON
EMIL UMBRICHT
ORLAN M. ARNOLD
BY Curtis, Morris & Safford
ATTORNEYS

United States Patent Office

3,299,621
Patented Jan. 24, 1967

3,299,621
ROTARY FLOW GAS WASHER
Nicholas J. Panzica and Robert M. Jamison, Detroit, Emil Umbricht, Northville, and Orlan M. Arnold, Grosse Pointe Park, Mich., assignors to Ajem Laboratories, Inc., Livonia, Mich.
Filed June 15, 1964, Ser. No. 375,034
3 Claims. (Cl. 55—223)

This invention relates to gas washers, and more particularly, to an improved device for washing particles of contaminant matter carried in a gas, e.g., air.

Air pollution has long been a problem, especially in the more densely populated and industrialized regions. The problem becomes greater as the world population grows, with greater concentration of people in urban areas and ever-increasing industrialization.

Typical examples of major sources of air pollution are the mineral refining and chemical industries, the metal manufacturing industries, and foundry operations connected with a host of manufacturing functions, and exhausts from power plants, both stationary and mobile. These and other industrial and commercial operations, where large amounts of air or other gases are used and then released to the atmosphere, are causative factors. The problem of air pollution is particularly acute where gases are the products of combustion or are used for sweeping or ventilating purposes, for example, in blast furnaces or in welding or paint booths.

Pollution is a grave danger, nuisance and cause of destruction directly and indirectly. The well-being of humans, animals and plant life is directly affected by the atmosphere. Contaminated, impure air can have serious and deleterious consequences on them. Polluted air can adversely affect property as well, with resultant damage thereto and loss of use and money, for example, when corrosive fumes are released in improved areas where it corrodes, abrades and/or soils buildings, furnishings, automobiles, etc.

Governmental agencies at all levels, stimulated in part by civic and community organizations, are becoming more alert to air pollution and its attendant consequences. Endeavoring to prevent pollution or at least to reduce the problem in magnitude, such agencies have enacted various statutes and ordinances, and promulgated regulations designed to alleviate the problem. The requirements of such controls are primarily directed toward the problem at its sources, or at least at major and obvious sources. In a great many areas, such requirements have long been in effect, but because of the growing nature of the problem they are being made more stringent and broadened in scope.

Gas washers of various types have been known and used for some time. One important and popular type of gas washer, which is readily adaptable to a large number of different situations uses water or other liquids to "wash" contaminant particles from air or other gases carrying them. That type of anti-pollution equipment is best used at the source of pollution, i.e., before the gas with entrained pollutants is released into the atmosphere. Such washers of one type generate a very intense spray of liquid, commonly by breaking up a stream of liquid by action of transverse surfaces rapidly moving, e.g., vanes on disks or bars of a squirrel-cage device. The bars or the vanes, as the case may be, break up the liquid into droplets, accelerate the droplets and hurl them outward as from a sling, forming a high energy spray. The contaminant-carrying gas is passed through the spray, where the liquid droplets contact and entrain the pollutant particles. The droplets are then removed from the gas flow, carrying the contaminant with them. The washed, cleansed gas can then be collected or exhausted to the atmosphere or used in other operations.

While such washers have successfully been used, and commonly attain remarkably high removal efficiencies, still the need often exceeds their capabilities. This is notably the situation with regard to very finely divided contaminant particles, so called ultra-fines. Such fines may be of an order of magnitude bordering on molecular sizes, e.g., in the range of one-half micron and smaller. Welding smoke, foundry and blast furnace stack gases, and gases around or used in pulverizing operations, e.g., pigment grinding, all are examples of sources of ultra-fine particles. Chemical and refining operations also contribute polluting vapors and condensates in or approaching molecular sizes.

Accordingly, it is an object of this invention to provide improved gas washers. It is also an object to provide gas washers better able to cleanse ultra-fine contaminant particles from industrial gases. Another object is to provide more efficient gas washers to effect savings in the cost of operating gas washers for decontaminating gases, and indeed, to reduce the number of washers required to do the job. A further object of the invention is to provide washers having versatility, that are easily and readily adaptable to a variety of different pollution-causing situations. These and other objects of the invention will be in part discussed and in part apparent in the disclosure hereinbelow.

We have established that the speed of the droplets is an important factor in the efficiency of gas cleaning. Droplets having greater speed have a greater probability of contacting contaminants in gases being washed. Moreover, it is important that the liquid droplets be removed from the gas before the liquid can evaporate. Until the contaminant is thus removed the gas cannot be considered clean.

Moving particles in a gas stream tend to be surrounded by an "envelope" of the gas. That envelope acts as a bumper or shock absorber and causes contaminant particles to be driven away from an approaching droplet. The phenomenon is an adverse one with respect to ultra-fine particles because of their relatively small mass and inertia. Increasing either the particles or droplet speeds tends to offset this repulsive effect.

Uniform distribution of droplets throughout the spray zone, and the gas flowing through the zone, are desirable.

In washers heretofore used, the gas flow has been substantially in a direction normal to the direction in which the liquid droplets are hurled. Thus either flow, of droplets or of gas, can be thought of as traversing the other. In seeking to improve such washers remarkable efficiencies have been attained by increase of particle speed. It has been learned, however, that merely increasing gas flow speed is not the entire key to complete removal.

Substantial increases of the gas flow rate, e.g., substantially beyond several thousand feet per minute velocity, through the spray zone has been found to result in a number of adverse effects. Droplet entrainment is one. The creation of gaps or void spaces, so-called "blow holes," in the spray is another. Thus the achievement of uniform gas distribution is made more difficult at higher flow rates.

It has now been found that the efficiency of particle removal can be notably increased in gas washers by exposing such contaminated gas to liquid droplets travelling at very high velocities relative to the entrained particles without excessively increasing the flow rate of the particle carrying gases or the power requirements for flowing the gas or generating the spray. By imparting to the gas flow a component of direction counter to that of the spray droplets the effectiveness of contact between the particles in the gas and the droplets in the spray can be increased, and so too the efficiency of pollutant removal from the gas.

It has been found that droplets leaving a rotating spray generator tend to travel in a direction close to the tangent of the rotor, and in the direction of rotation, rather than radially outward from the center of rotation. The direction component imparted to the gas flow is advantageously transverse, or contrary to the direction of the generator rotation. Thus, the relative speed between the particles carried by the gas flow and the droplets traversing the flow is increased, while the actual speed of the flowing gas and the liquid droplets need not be increased. Since it is not necessary to increase the latter speeds, the adverse effects mentioned above are minimized, while the advantages provided by high speeds, e.g., the greater probability of contact between the particles and droplets, are attained. It has also been found advantageous to operate with an up-draft in the gas washer instead of a down-draft which previous work had favored. Although the down-draft does have the advantage of impacting gas flow with the surface of the liquid in the reservoir, and of inertial separation of the particles from the gas, by sudden change of direction of the flow, we have now found that with modifications herein disclosed a better over-all effect is secured with up-draft, and thus allows us to gain the advantages of reducing pressure loss, maintaining a better spray distribution and avoding "holes" or "shadows" in the pattern, where gas flow can break through without full exposure to the liquid droplets. The up-draft also reduces the problem of depositing solids in the apparatus, where they must be dug out from time to time, and assures that the solid particles will be caught and carried off by the liquid of the spray pattern.

We have also found that it is advantageous to design our washer so that the droplets traverse the air flow and are promptly removed therefrom, so that liquid does not evaporate and return the contaminant to entrainment in the gas.

Apparatus suitable for effecting the objects of the invention are illustrated in the several embodiments shown in the accompanying drawings wherein.

Figure 1:
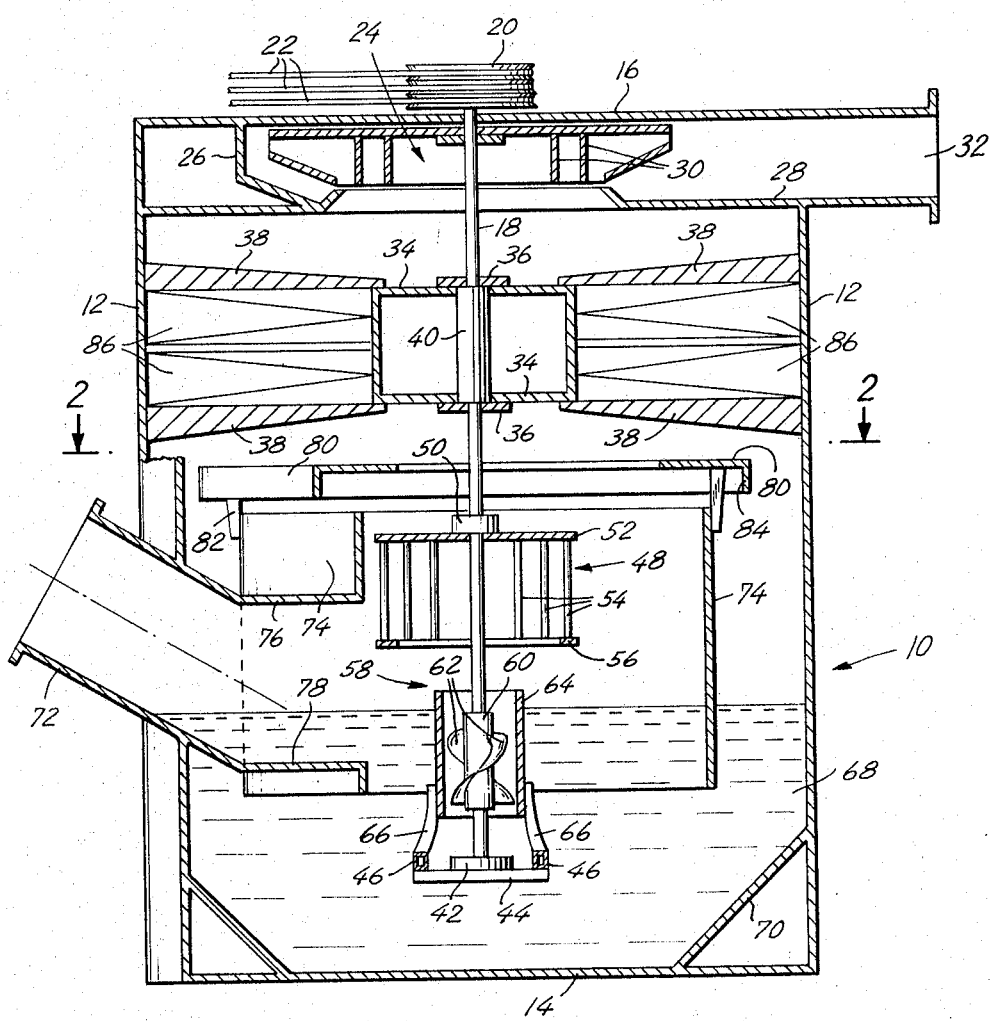
FIGURE 1 is a vertical section, partially in an axial plane and partially in a plane divergent therefrom, and showing a gas washer according to the invention.

Referring to FIGURE 1, it will be seen that the gas washer 10 shown therein comprises a housing 12 having a base 14 and a top 16. Extending axially into the washer is a shaft 18 at the upper end of which are multiple drive sheaves 20 around which multiple V-belts 22 are connected to form a drive connection with a motor (not shown). Immediately below the top 16 and mounted on the shaft 18, is a blower 24 within a housing having an end wall 26 and a lower wall 28. The blower 24 has a number of radial impeller blades 30 which, upon rotation of the blower, move air or gas to be washed through the washer and then out through an exhaust duct 32.

The shaft 18 is supported in the housing 12 by bearings 36 held by hubs 34 which are supported and fixed by frame members 38 extending from the housing wall. For additional bearing and support, a collar 40 may be fitted around the shaft 18 and secured between the two bearings 36 to the hub members 34. The lower end of the shaft may also be mounted in bearings 42 which are supported by cross arms 44 secured on beam members 46. In many cases two bearings would suffice to support the shaft within the housing and therefore one of the bearings could be eliminated, for example, the lower bearing 42 as in the washer shown in FIGURE 5.

Supported on the shaft 18 within the housing 12 is a spray generator 48, suitably connected to the shaft by bolting or welding it to a flange 50 on the shaft. The generator 48 is comprised of an upper disk 52 directly attached to the flange 50, a number of downwardly extending rods or bars 54 around its periphery, and an annular plate 56 secured to the lower ends of the bars. As previously noted, another form of the spray generating means is a vaned impeller disk such as disclosed in application Serial No. 80,822 filed January 5, 1961, now U.S. Patent 3,168,596 issued February 2, 1965.

Near the lower end of the washer 10 is a pump 58. It consists of an impeller 60 on the shaft and keyed thereto. This impeller has a number of helical vanes 62 for driving water or other liquid through a sleeve 64 closely surrounding the impeller vanes 62. The sleeve 64 confines liquid so that the vanes 62 can drive it upward and also serves to guide the liquid into the generator 48 through the central opening in the lower ring 56 thereof. The director sleeve is supported by brackets 66 extending upwardly from the frame members 46. Pending application Serial No. 145,509 filed October 16, 1961 discloses in more detail similar pumping devices.

In the base region of the washer 10 is a reservoir 68 for containing a volume of washing liquid. The reservoir 68, as shown, is formed by the housing 12, a truncated, conical corner brace 70 and the base 14 of the washer. As shown, the liquid droplets, after traversing the gas flow and collecting contaminants therein, merge on the walls 14 and/or the spray eliminators 86 and flow off away from contact with the gas. If this contaminant is dust which readily settles out, the liquid may be adequately reconditioned by standing in the reservoir 68, and removing settled solids from its bottom. Otherwise, it will be desirable to purify or clarify the liquid before re-use, e.g., by methods and/or apparatus such as disclosed in other patent applications Serial Nos. 328,673 filed December 6, 1963 and 343,335 filed February 7, 1964 and U.S. Patents Nos. 2,949,285 and 2,833,417.

It should be appreciated that, although water has been the most commonly used liquid in gas washers of this type, other liquids, such as common organic solvents can also be used according to the requirements of a particular application. Various agents can be incorporated with the washing liquid, to enhance its effectiveness, including foam depressants, corrosion inhibitors and surface tension reducers.

In some uses of these washers, removal of the contaminants can advantageously be achieved by chemical reaction between the particle and the spray droplets, especially for fume pollutants. A suitable chemical agent would, accordingly, be used a washing liquid in such a situation.

Figure 2:
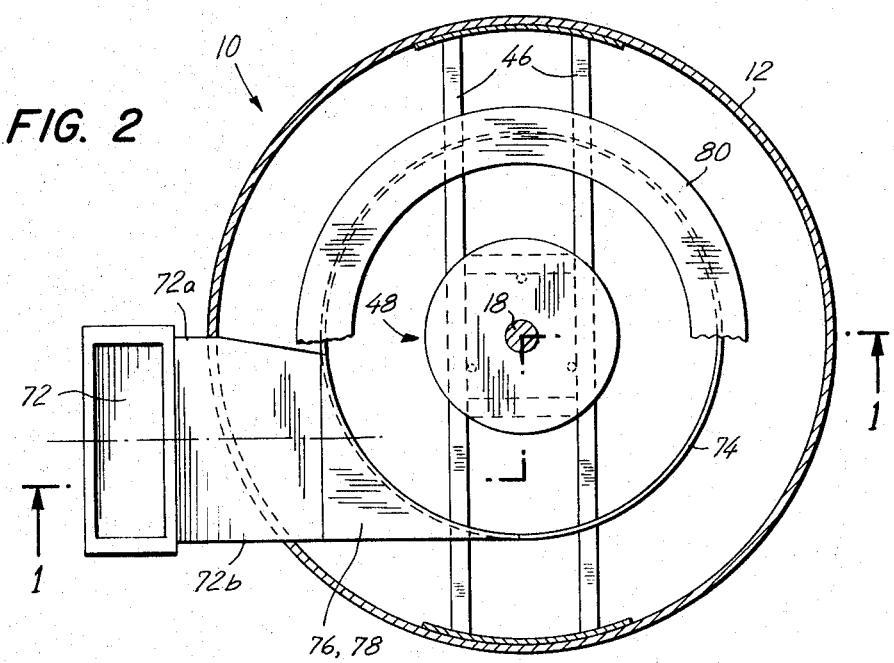
FIGURE 2 is a horizontal section taken along the line 2—2 of FIGURE 1 and shows a gas washer of the invention.
Figure 3:
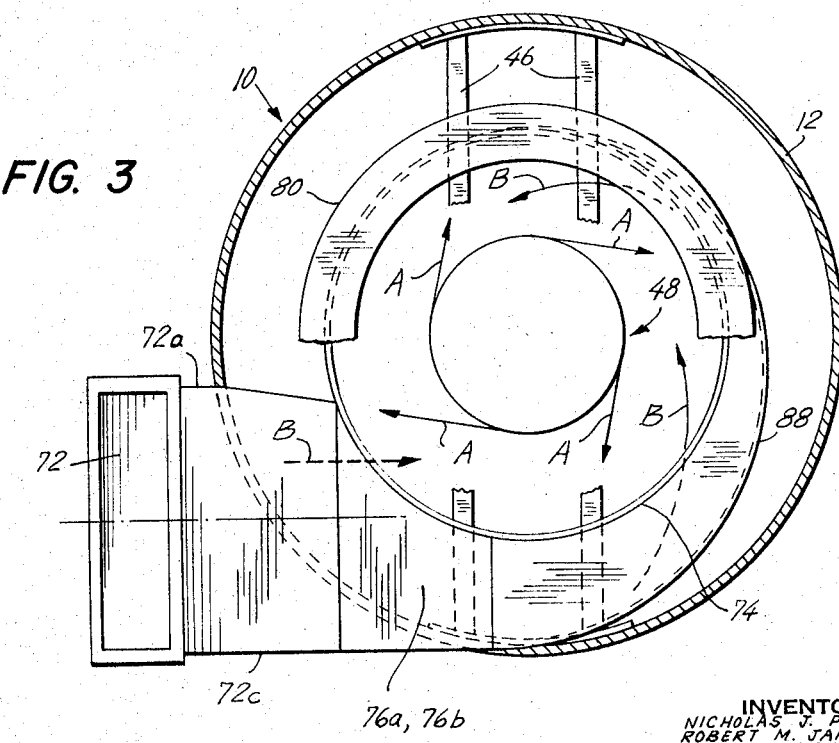
FIGURE 3 is a horizontal section similar to that of FIGURE 2 but showing another embodiment of the present invention.

At one side of the housing 12 is an inlet duct 72 through which air to be washed is drawn by the rotating blower 24. It will be noted that the inlet 72 is directed downwardly at an angle of about 30° to the surface of the liquid in the reservoir 68, and, especially from FIGURES 2 and 3, is located off-center with respect to the housing. That is, the axis of the duct 72 is not in a plane containing the axis of the shaft 18, i.e., it is non-radial. The plane of one side 72a of the duct includes or is near to the axis of the shaft, and can be on either side of that axis, preferably on the same side as the axis of the duct. The other side 72b of the duct can be tangent to the housing 12 (FIGURE 3) or along a chord thereof (FIGURE 2). The direction of the inlet relative to the reservoir surface is designed to sweep the gas along the surface of the liquid rather than to give a high impingement effect thereagainst.

Located within the housing 12 and surrounding the generator 48 is an annular baffle 74 which serves to confine the gas to be washed as it passes upwardly through the spray zone to a region close to the generator, and therefore, within the most intense region of the spray. The upper elevation of the baffle 74 may be at a level about equal to the upper disk 52 of the generator 48, or slightly higher as shown or slightly lower. The lower end of the baffle 74 extends down into the reservoir 68 below the level of the liquid therein to form a seal between the baffle 74 and the outer housing wall 12, thus confining gas entering within the baffle 74 and preventing gas from bypassing around the spray zone. The inlet duct 72 passes through the outer housing wall 12 and communicates with the baffle 74 by means of wall plates 76, 78. The arrangement and communication of the duct 72 with the baffle 74 will be discussed in more detail with reference to FIGURES 2 and 3.

Positioned above the baffle 74 is a satellite ring baffle 80 supported from the baffle 74 by brackets 82. The satellite ring is an annular plate, optionally having a vertical circular peripheral member 84. This serves to catch any portion of the spray rising above the baffle 74 or droplets ricochetting therefrom. As liquid collects on the ring it will drain off onto and down from the flange 84 and drip back to the reservoir 68. The satellite ring 80 also serves to distribute the upwardly travelling washed gas throughout the entire cross-sectional area of the housing.

Above the ring 80 and between the support members 38 are located a plurality of radially disposed baffles 86 to serve as spray eliminators. The eliminators 86 form a very tortuous passage for the upwardly flowing gas and serve to remove liquid droplets which may be entrained in the gas flow. Since the gas is more able to negotiate the tortuous passages between the eliminators 86, than the water droplets, the liquid is deposited on the eliminators and is removed from the gas. Deposited droplets merge, accumulate, and drain downward from the eliminators and work their way back, principally along the housing wall 12, into the reservoir 68 in the base of the washer 10.

Referring now to FIGURE 2, it will be seen that the inlet duct 72 is positioned non-radially, advantageously more or less tangentially, to the washer 10. The duct 72 passes through the outer housing wall 12 and is fitted to an opening in the vertical circular barrier 74. The horizontal plates 76, 78 and the duct side walls 72a, 72b between the inlet and the baffle 74 form the passage. Thus, as gas flows into the washer through the duct 72 it will enter the space bounded by the barrier 74.

Because of the off-set or non-radial disposition of the inlet, the gas will impinge upon the circular baffle 74 and will be imparted with a rotary motion in a counter-clockwise direction as it passes within the space bounded by the baffle. Hence, as the gas moves upwardly through the spray zone it will be swirling, i.e., it will have a component of direction in the plane of, but opposed to the clockwise rotation of, the generator 48. As previously noted the liquid droplets thrown outwardly by the generator 48 tend to be thrown in more or less tangential or non-radial directions relative to the spray generator's rotation. The directions of the gas swirl and the spray droplets are illustrated in FIGURE 3 wherein the arrows A show the direction of droplets leaving the generator 48 and the arrows B show the horizontal swirling of the gas as it passes into the washer and rises through the spray zone bounded by the baffle 74. Thus, the droplets will be thrown transversely across the gas flow, and the gas flow will have a component counter to the direction of the droplets so that the speed of the spray droplets and contaminant particles in the gas relative to one another will be greater than their actual speeds within the washer. The advantages previously described, attainable with high velocity according to the invention, are thereby achieved.

In FIGURE 3, another embodiment of the invention is depicted. There it will be seen that one end 72*c* of the inlet duct 72 is tangential to the outer housing 12 instead of to the inner barrier 74. A transition wall or baffle 88 spans from the point of tangency to the inner circular baffle 74. Enlarged transition plates 76, 78 are used to complete the communication between the inlet duct 72, and the transition baffle 88 and the baffle 74. The effect of the completely tangential entry is similar to that described with respect to FIGURE 2. That is, the inwardly flowing gas tends to rotate within the space bounded by the baffle 74 because of the off-set alignment of the duct 72 and the transition piece 88. Therefore, as the gas flows upwardly through the spray zone it will have a component of direction in the plane of but opposed to the direction of the liquid droplets being hurled from the generator 48.

It should be noted with respect to any of the embodiments shown in FIGURES 1 to 3, that the lower horizontal duct plate 78, between the inlet duct 72 and the circular baffle 74, can be eliminated since the liquid within the reservoir 68 provides a surface for guiding the in-flowing gas.

Another embodiment of the invention is shown in FIGURES 4 and 5.

FIGURE 4 shows a plurality of guide plates 90 of a suitable material, for example, a corrosion-resistant steel or a plastic, which are arranged in an annular pattern as shown. Because of the sloped disposition of the guides, a gas flowing through the annulus formed by these plates will be given a rotary or twisting component. Thus, the assembly of guide plates can be used in addition to or in place of the tangential inlet to give the desired rotary effect in the upwardly flowing gas.

FIGURE 5 illustrates the incorporation of the guide plates 90 in a typical gas washer 10. An inlet duct 72*d* is at one side of the housing 12 having a spray generator 48 supported by a shaft 18*a* journaled in overhead bearings (e.g., as shown in FIGURE 1 and previously discussed), an annular baffle 74*a* around the generator and a satellite baffle 80 with a vertical rim 84*a* around its inner periphery. In this embodiment, the washing liquid is fed from the reservoir 68 by means of a pump 93 which is independent of the shaft 18*a* and supported on beam members 97. The suspension and drive of the generator and the independent pump might be similar to the apparatus disclosed in Patent No. 2,789,866 to Emil Umbricht. Liquid from the pump passes through a pipe 94 and enters the generator 48. A deflecting head 92 in the flared end of the pipe 94 helps distribute the liquid in a hollow conical pattern uniformly over, and substantially limited to, the spattering bars of the cage generator 48. It will be noted in this embodiment that the lower end of the vertical barrier 74*a* does not go into the liquid in the reservoir 68 but is cut short at or below the level of the lower ring 56 of the generator 48. In some cases there is advantage in terminating it above the ring, but generally it is better as shown.

Spanning radially inward from the inner periphery of the barrier 74*a* are the guide plates 90, assembled as shown in FIGURE 4. An annular flanged collar 91 is used to support the inward ends 90*a* of guide plates 90 as well as the feed pipe 94. Thus, as the gas to be washed flows in through the duct 72*d* and begins its passage upwardly through the washer 10, it must pass the guide plates 90, and will be deflected by them so as to be swirled about the axis of its flow with a component of its flow direction counter to that of the washing liquid droplets between the generator 48 and the baffle 74*a*.

Since the circular barrier 74*a* does not enter the liquid in the reservoir 68, provision must be made to prevent the passage of gas upwardly between the barrier 74*a* and the outer housing wall 12. A circular plate 85 for that purpose is positioned between the barrier 74a and the housing wall 12. The plate 85 is supported at both its outer and inner peripheries by braces 87. To provide for liquid draining off the satellite ring 80 and the eliminators 86 (not shown in FIGURE 5), drain slots 96 are provided in the plate 85 adjacent the housing wall 12. Those drain slots communicate with the reservoir through passages 95 formed by means of panels 94, which may be semi-circular in configuration, adjacent to the housing wall. The panels extend down into the liquid to form seals.

A number of considerations pertaining to the use of the annular assembly of guide plates 90 may be noted. The inlet duct 72a need not be off-set from a radius of the washer or tangential to the washer, as shown in FIGURES 1 to 3, because when the guide plates 90 are used they impart the desired rotary motion or swirling. However, it will be appreciated that both a tangential or off-set inlet as well as guide plates 90 can be incorporated into a single washer. For example, the guide plate assembly could be used with the embodiment shown in FIGURE 1. The assembly in such a situation would be located within the barrier 74 to impart additional rotary motion to the upwardly flowing gas. It will also be understood that the pump depicted in FIGURE 1 can be used with the embodiment of FIGURE 5 thereby eliminating the separate pump 93 and its conduit 94. It will also be apparent that the cross-sectional configuration of the housing 12 need not be round, but can be elliptical, square, etc., since the vertical baffle 74 and the position of the inlet duct 72 with respect thereto or the guide plate 90 assembly are mainly responsible for the impartation of the rotary component to the gas.

Gas washers according to this invention can be constructed from various capacities in the range of from about 1000 standard cubic feet per minute to 40 or 50 thousand standard cubic feet per minute. Accordingly, the sizes of the washer vary from a few feet in diameter to as much as 10 or more feet in diameter. The heights of the washers also vary from approximately equal to about half again as high as they are wide. The generators for spraying the washing liquid have diameters usually on the order of half to a quarter of the washer diameter and heights varying from substantially less than to substantially more than their diameter. The generators are normally rotated at from about a few hundred to as many as several thousand r.p.m. Washing liquid rates in the washers are in the order of from 100 to 500 gallons of liquid per minute.

A number of tests have been made using different gas washers in order to compare the efficiency of removing contaminant particles. In one test, an old gas washer capable of washing about 25,000 standard cubic feet per minute having an inlet whose axis was along a radius from the center of the washer was used to wash a paint pigment known as ASP-100, which has approximately 45% of its particles of less than ½ micron size, from air. A similar washer with the inlet off-set to one side, for example as shown in FIGURE 2, was also tested using the same impurity in the air stream. The washer having the off-set inlet, and therefore rotary motion in the upwardly flowing gas, reduced the contaminant 17% more than the older washer, that is, the amount of pigment material remaining in the gas after washing was 17% less as compared to the older type with the on-center-line inlet. Similar tests were made using a washer such as the one depicted in FIGURE 3, that is, where the off-set inlet has one wall tangentially located with respect to the outer housing. Removal of material from the gas flow was 39.7% better than in the case with the on-center-line inlet.

Figure 4:
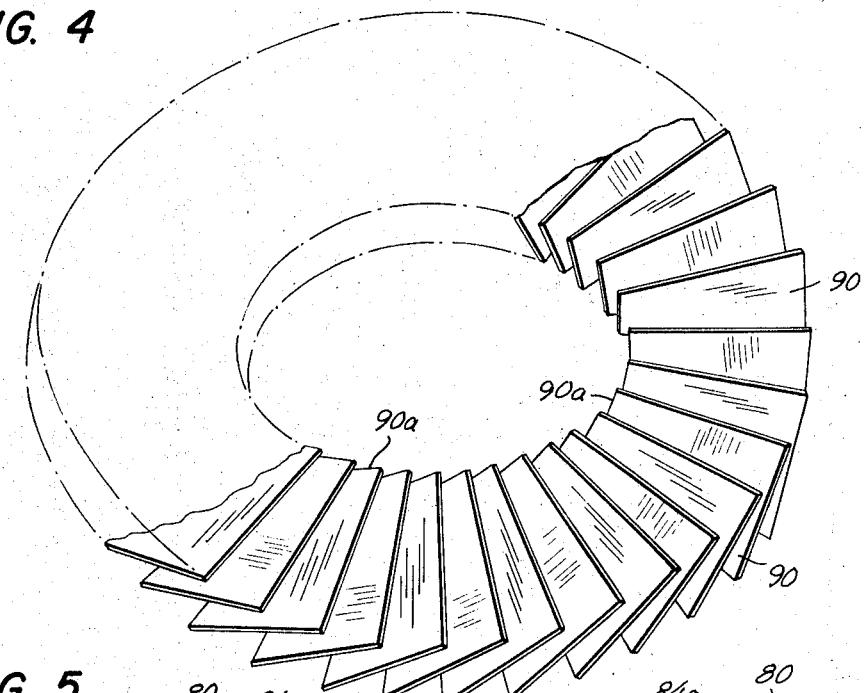
FIGURE 4 is a perspective view showing an arrangement of a multiplicity of sloping radial baffles or guide plates.
Figure 5:
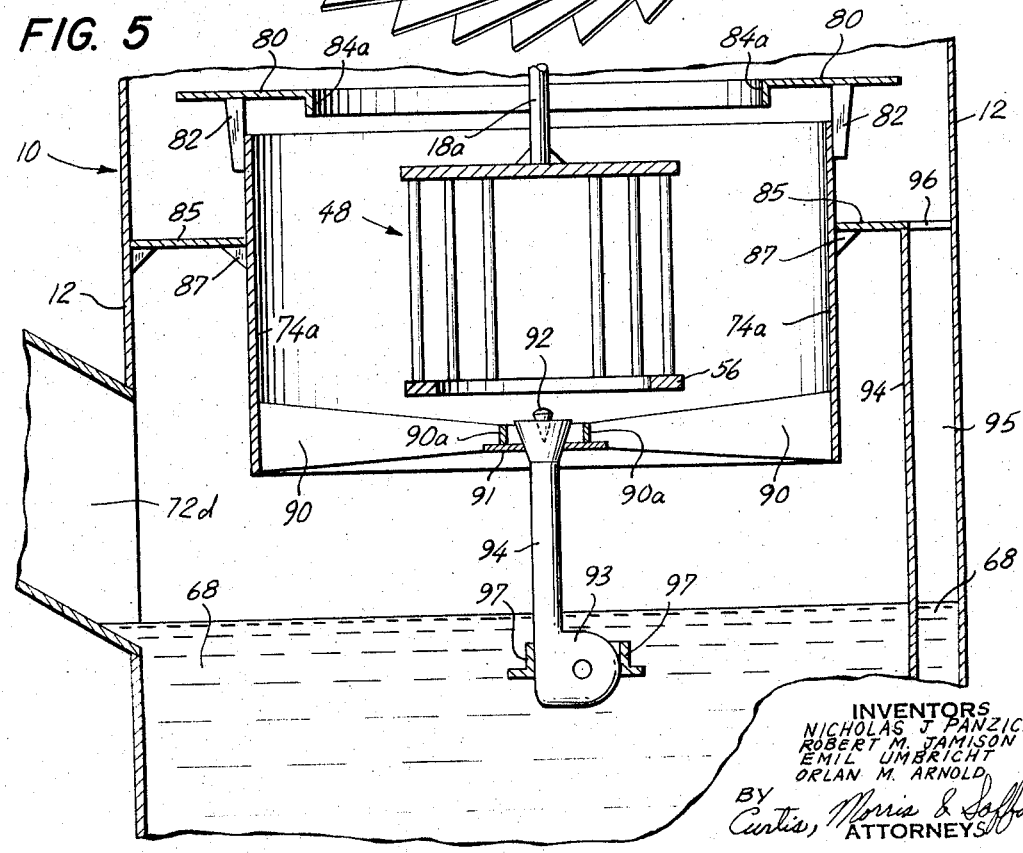
FIGURE 5 is a vertical axial section of the central portion of a gas washer showing the arrangement of the guide plates of FIGURE 4 in the washer.

Another comparison test, to determine the effectiveness of using an annular guide plate assembly, was made using a washer having a square outer housing and a circular inner vertical baffle, such as indicated by numeral 74 in the drawings, to wash cupola furnace exhaust gases. In one case the washer, which had a 27,000 standard cubic feet per minute gas capacity, had an inlet whose axis was on a radius of the washer, that is, a symmetrical inlet. When the annular guide plate assembly, such as shown in FIGURES 4 and 5, was inserted into the washer, the amount of contaminants, cupola stack dust, in the outlet after the gas had been washed was reduced an average of 32.3%.

Preferred embodiments of this invention and various modifications thereof have been shown and described in this application; but it is to be understood that the methods, apparatus and assemblies set forth for illustration of the invention are particular manifestations of the inventive concepts disclosed herein and defined in the appended claims, and are chosen for illustrative purposes so that others skilled in the art will fully understand the invention and will be enabled to modify it and make substitutions each as may be best adapted to the conditions and requirements of its particular use.

We claim:
1. An improved gas washing device having a vertical cylindrical housing with an inlet and at a higher elevation an outlet and a washing liquid reservoir in its base, blower means for flowing a gas to be washed through a spray zone in said housing, rotary spray generating means for comminuting a flow of washing liquid and hurling it generally tangentially outwardly in a spray of high velocity droplets in said zone, and means for feeding liquid from said reservoir to said spray generating means, said device being characterized by said inlet being tangential to said housing and by having a baffle extending tangentially from the inside of said housing around said spray generating means for swirling said gas flow along its line of flow through said spray zone.

2. An improved gas washing device comprising a cylindrical housing having an inlet tangential to said housing and an outlet at a higher elevation than said inlet, a washing liquid reservoir in the base of said housing, blower means for flowing a gas to be washed through a spray zone in said housing, rotary spray generating means comminuting a flow of washing liquid and hurling it generally tangentially outwardly in a spray of high velocity droplets in said zone, means for feeding liquid from said reservoir to said spray generating means, and a baffle extending tangentially from the inside of said housing around said spray generating means for swirling said gas flow along its line of flow through said spray zone.

3. An improved washer according to claim 2 wherein the lower end of said baffle extends into the liquid in said reservoir to form a liquid seal.

References Cited by the Examiner

UNITED STATES PATENTS

| | | | |
|---|---|---|---|
| 1,751,324 | 3/1930 | Green | 55—247 X |
| 1,818,742 | 8/1931 | Paradise | 55—238 X |
| 1,946,291 | 2/1934 | Miller | 55—229 X |
| 2,007,759 | 7/1935 | Harmon | 55—235 X |
| 2,688,377 | 9/1954 | Nutting | 55—229 |
| 2,889,005 | 6/1959 | Umbricht | 55—249 X |
| 3,128,320 | 4/1964 | Umbricht | 261—79 |
| 3,149,935 | 9/1964 | Jamison et al. | 261—79 |
| 3,175,340 | 3/1965 | Schulze | 261—79 |
| 3,205,641 | 9/1965 | Jamison et al. | 55—230 |

REUBEN FRIEDMAN, *Primary Examiner.*

J. ADEE, *Assistant Examiner.*